US006897973B1

(12) United States Patent
Brookner et al.

(10) Patent No.: US 6,897,973 B1
(45) Date of Patent: May 24, 2005

(54) SYSTEM AND METHOD FOR MANAGEMENT OF CORRESPONDENCE

(75) Inventors: George Brookner, Norwalk, CT (US); Robert G. Schwartz, Branford, CT (US)

(73) Assignee: Ascom Hasler Mailing Systems Inc., Shelton, CT (US)

( * ) Notice: Subject to any disclaimer, the term of this patent is extended or adjusted under 35 U.S.C. 154(b) by 0 days.

(21) Appl. No.: 09/646,404

(22) PCT Filed: Mar. 18, 1999

(86) PCT No.: PCT/US99/05893

§ 371 (c)(1), (2), (4) Date: Sep. 18, 2000

(87) PCT Pub. No.: WO99/48054

PCT Pub. Date: Sep. 23, 1999

Related U.S. Application Data

(60) Provisional application No. 60/078,487, filed on Mar. 18, 1998.

(51) Int. Cl.[7] .......................... G06K 15/00; H04N 1/32

(52) U.S. Cl. .................. 358/1.15; 358/468; 379/100.01

(58) Field of Search ......................... 358/1.4, 1.6, 1.12, 358/1.15, 3.29, 468, 400, 401, 406, 407; 379/100.01, 100.05, 102.02

(56) References Cited

U.S. PATENT DOCUMENTS 4,800,506 A * 1/1989 Axelrod ...................... 364/478
5,272,640 A 12/1993 Wu et al. .............. 364/464.02
5,292,004 A * 3/1994 Cesarini ..................... 209/3.1
5,513,117 A 4/1996 Small ......................... 364/479
5,530,740 A 6/1996 Irribarren et al. ............. 379/89
5,555,351 A * 9/1996 Craig ......................... 395/114
5,568,536 A 10/1996 Tiller et al. .................... 379/58
5,586,037 A 12/1996 Gil et al. ............... 364/464.03
5,648,916 A 7/1997 Manduley ................... 364/514
5,668,973 A 9/1997 Stutz et al. ................. 711/152
5,712,542 A 1/1998 Stutz et al. .................... 318/66
5,737,395 A 4/1998 Irribarren ...................... 379/88
5,838,768 A 11/1998 Sumar et al. ................. 379/89
5,881,233 A 3/1999 Toyoda et al. ......... 395/200.48
6,064,994 A * 5/2000 Kubatzki .................... 705/410
6,341,274 B1 * 1/2002 Leon .......................... 705/410
6,349,292 B1 * 2/2002 Sutherland ................... 705/62

FOREIGN PATENT DOCUMENTS

WO WO 97/46389 12/1997
WO WO 98/08325 2/1998
WO WO 98/13790 4/1998

* cited by examiner

*Primary Examiner*—Jerome Grant II
(74) *Attorney, Agent, or Firm*—Perman & Green, LLP.

(57) ABSTRACT

In the system of the invention, a user provides inputs at a user interface (51). The user's inputs relate to the expected type of delivery (2, 3, 4, 5, 6). Alternatively, the system may already have information stored as to the type of delivery (2, 3, 4, 5, 6) to be used with particular correspondents. Based on the type of delivery (2, 3, 4, 5, 6), the system (50, 52, 53, 54, 55) determines for each item of correspondence, whether the delivery will be by physical delivery of a printed document (2, 3, 4), by fax (5) or by e-mail (6). The system (50, 51, 52, 53, 54, 55) further determines for each item of correspondence, which is to be delivered by physical delivery a printed document (2, 3, 4), whether an envelope (10, 11) is required and if the address information is to be printed on the envelope or on a label (12) that is to be applied to the envelope. Further in the case of an item of correspondence, which is to be delivered by physical delivery a postage indicia is printed on the envelope or on a label (12) that is to be applied to the envelope. If the system (50, 51, 52, 53, 54, 55) determines for an item of correspondence that the delivery will be by fax (5), then the correspondence is sent using fax (55). If the system (50, 51, 52, 53, 54, 55) determines for an item of correspondence that the delivery will be by e-mail (6), then the correspondence is sent using a SMTP server (54).

8 Claims, 4 Drawing Sheets

SYSTEM AND METHOD FOR MANAGEMENT OF CORRESPONDENCE

The invention relates generally to postage meters (franking machines), and relates particularly to systems in which items of correspondence are to be dispatched by any of several different means. The application claims priority from U.S. application No. 60/078,487, filed Mar. 18, 1998, which application is incorporated herein by reference to the extent permitted by the designated and elected States hereto.

BACKGROUND

It has been well known for many decades to use a postage meter which has within a secure housing an accounting means and a printing means. The accounting means includes an ascending register indicative of postage that has been printed, and typically a piece counter indicative of the number of mail pieces that have been printed. In many countries including the United States, the accounting means also includes a descending register indicative of the amount of postage value available to be printed. The printing means is used to print postage indicia on mail pieces, typically by a relief printing die with characteristic fluorescent ink. Such postage meters have worked exceeding well for decades and have proven to be reliable. While it is technically possible to print postal indicia for which no money has been paid to the post office, such fraud is relatively infrequent because it would be readily detectable through physical inspection of the meter for tampering.

The postage meter saves the postal authority from much of the work of printing, stocking and selling postage stamps. When postal rates change, the postage meter user can simply print the new postal amount, while the stamp user must queue up at the post office to purchase stamps in the new denomination.

In recent years it has been proposed to print postal indicia by means of conventional nonsecure printers such as laser printers, inkjet printers, and thermal transfer printers. Such printers are termed "nonsecure" because the printer itself is not in a secure housing and because the communications channel linking the printer to other apparatus is nonsecure.

Under such a proposal, the question naturally arises what would prevent a user from printing the same postal indicium repeatedly, thereby printing postal indicia for which no money has been paid to the post office. The proposed anti-fraud measure is to store information within the indicia which would permit detecting fraud. The indicium would include not only human-readable text such as a date and a postage amount, but would also include machine-readable information, for example by means of a two-dimensional bar code. The machine-readable information would be cryptographically signed, and would include within it some information intended to make fraud more difficult. The information would typically include an identification of the postage meter license (granted by the meter manufacturer or by the postal authorities, depending on the country), an indication of the number-of mail pieces franked, the postage amount, a postal security device identifier about which more will be said later, the date and time, and a zip code or post code of the mail piece addressee.

There are, of course, many potential drawbacks to such an approach for printing of postal indicia. A user who intends to defraud the postal service might use a bar-code reader to read the contents of the indicium. (This capability illustrates the pointlessness of trying to give physical security to the printing means or of the communications channel by which the printing means is controlled.) The contents of the bar code could be used to print identical or nearly identical indicia, perhaps at a geographic distance. It would then fall to the postal service to perform an analysis on all or nearly all of the indicia scanned on a particular day, to try to identify duplicates.

Yet another drawback is that it is commonplace for a mail piece to get smudged on the way to the post office or within the post office, prior to the authentication scanning by the post office. If the post office is unable to read the bar code, the post office has to decide whether to return the mail piece to the sender, or risk delivering a mail piece bearing a counterfeit indicium.

The typical apparatus for printing such "encrypted indicia" postage includes what is called a postal security device or PSD. The PSD has a secure housing, and within the secure housing are the accounting registers as well as a cryptographic engine. The engine permits cryptographic authentication and signing for communication with an external device such as the computer of the meter manufacturer or of the post office. The engine also permits creation of postal indicia which contain specified information and which are cryptographically signed. The PSD may well be physically small as compared to traditional postage meters. The PSD may be the size of a PCMCIA card or the size of a smart card.

Within the PSD the memory must be protected against inadvertent damage due to malfunction of the processor of the PSD, for example as set forth in U.S. Pat. No. 5,668,973, Protection system for critical memory information owned by the same assignee as the assignee of the present application. The PSD must handle power failure in a graceful fashion, for example as set forth in U.S. Pat. No. 5,712,542, Postage meter with improved handling of power failure, also owned by the same assignee as the assignee of the present application.

To reduce smudging, the printer may preferably be that described in PCT publication no. 97-46389, Printing apparatus, also owned by the same assignee as the assignee of the present application. While it has been proposed that the PSD contain a real-time clock which is keeping time continuously, desirably this requirement may be avoided as described in PCT publication no. 98-08325, Printing postage with cryptographic clocking security, also owned by the same assignee as the assignee of the present application. PSDs can form part of a network with multiple printers as described in PCT publication no, 98-13790, Proof of postage digital franking, also owned by the same assignee as the assignee of the present application.

It has become commonplace in recent years to correspond by a variety of different means, for example by means of printed documents that are physically delivered, by means of fax, and by means of email. Among, physically delivered documents there are documents sent in envelopes bearing addresses print ed thereon, and documents sent in envelopes or packages that are addressed by means of adhesive labels.

It would be advantageous to have a system with great flexibility to accommodate a number deliver methods.

SUMMARY OF THE INVENTION

In the system of the invention, a user provides inputs at a user interface. The user's inputs relate to the expected type of delivery. Alternatively the system may already have information stored as to the type of delivery to be used with particular correspondents. The system handles a sequence of items of correspondence. For each item it is determined whether the delivery will be by physical delivery of a printed document, by fax, or by email. Furthermore, it is determined whether a printed document will be enclosed in an envelope upon which an address is to be printed, or whether it will be enclosed in an envelope or package which receives printed address labels. In the case of physically delivered items, the system also generates a postal indicium which is either printed on an envelope or on a label to be placed on an envelope.

DESCRIPTION OF THE DRAWING

The invention will be described with respect to a drawing, of which.

DETAILED DESCRIPTION

Figure 2:
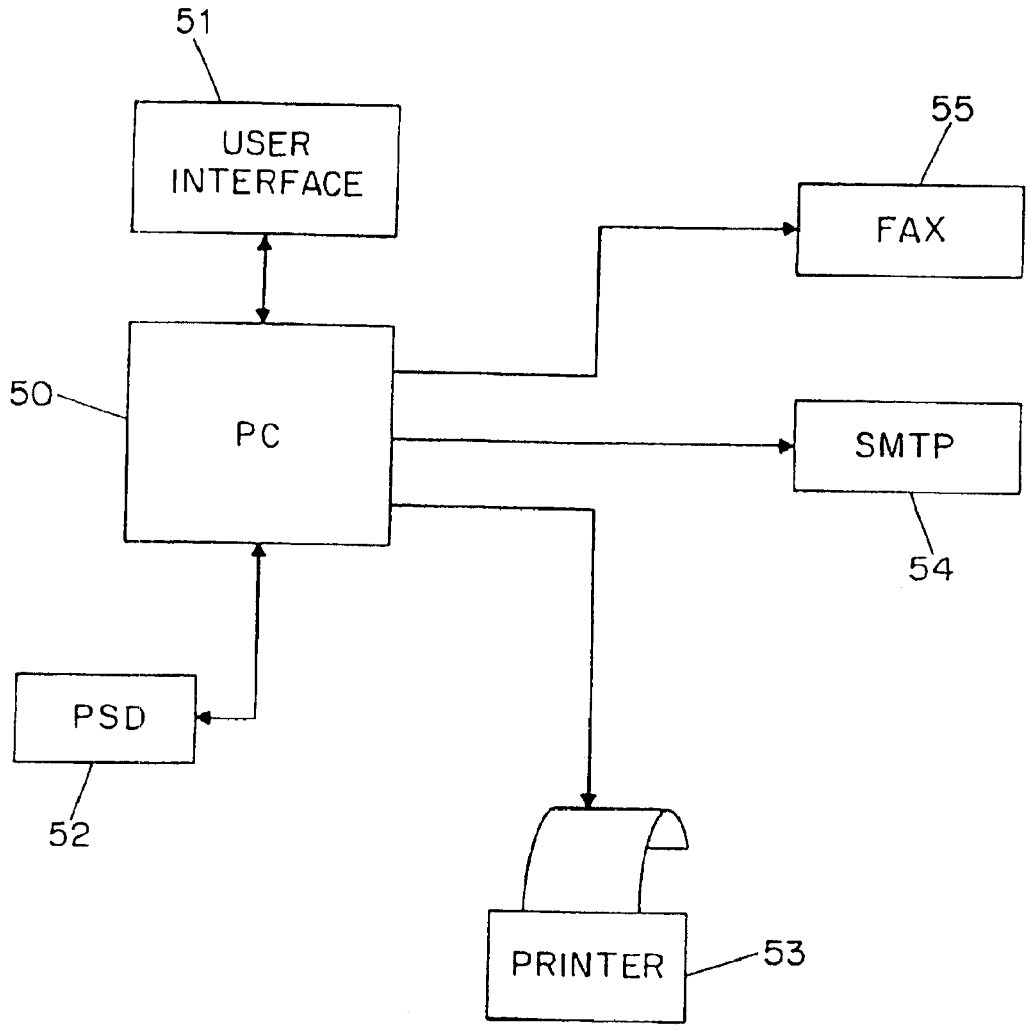
FIG. 2 is a functional block diagram of the system.

The system according to the invention is typified by a personal computer 50, shown in FIG. 2. The personal computer 50 receives, or has stored within it, information about a number of items of correspondence to be sent, all omitted for clarity in FIG. 2. The computer 50 has at least one printer 53, and preferably has more than one printer, one optimized for printing on paper sheets, and another optimized for printing on label stock and envelopes. The computer 50 has a postal security device 52, as discussed above. The postal security device 52 has nonvolatile memory and a cryptographic engine, and under stored program control it is able to generate digitally printed postal indicia which will be accepted by the postal authorities for payment of postage. The indicia are printed on the printer 53. In addition, the computer 50 has connected with it, or includes, a Simple Mail Transport Protocol(SMTP) server 54, and a fax server or fax modem 55. The user controls the computer 50 through a user interface 51.

Figure 1A:
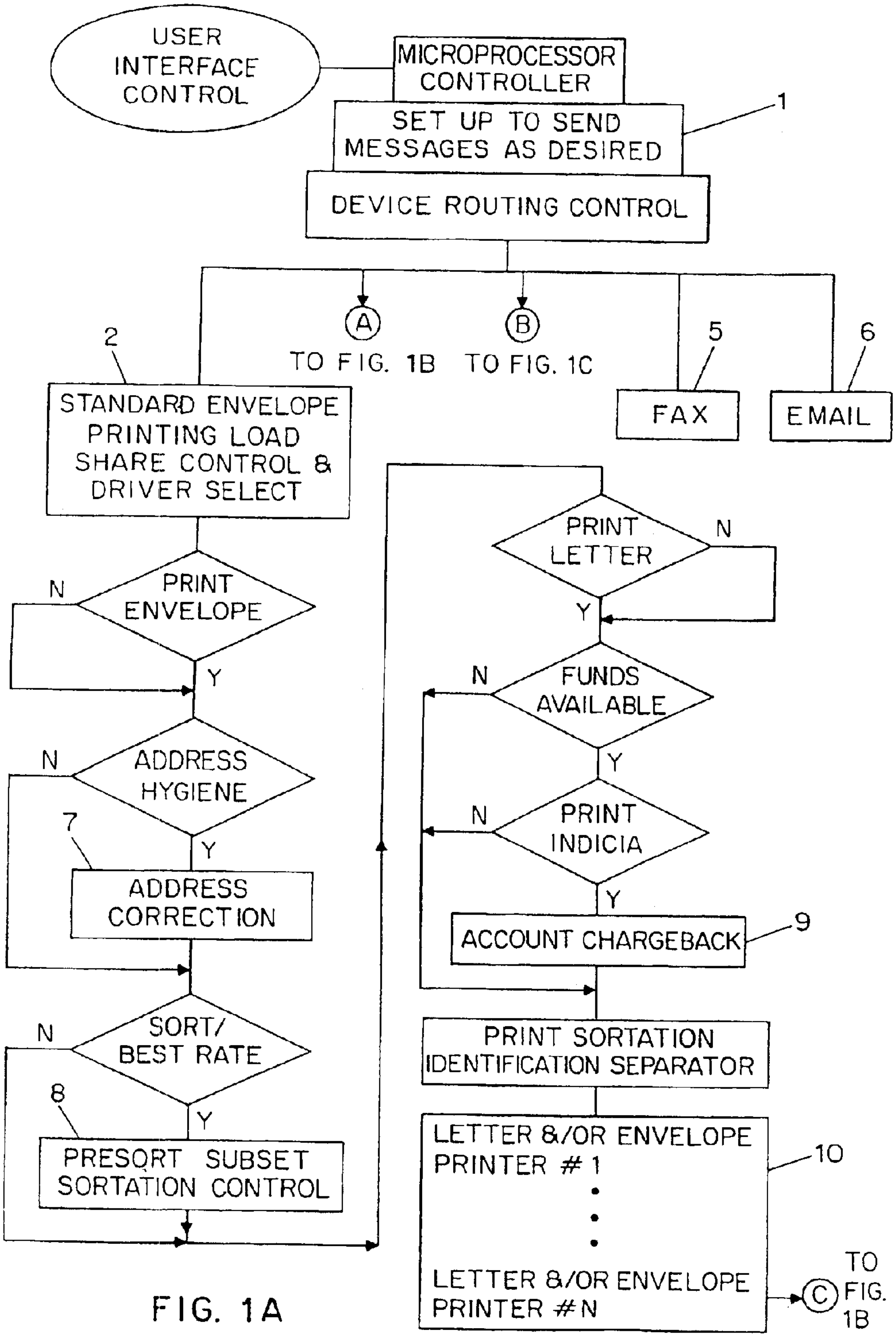
FIG. 1 shows a flow chart depicting handling of correspondence in keeping with the invention.
Figure 1B:
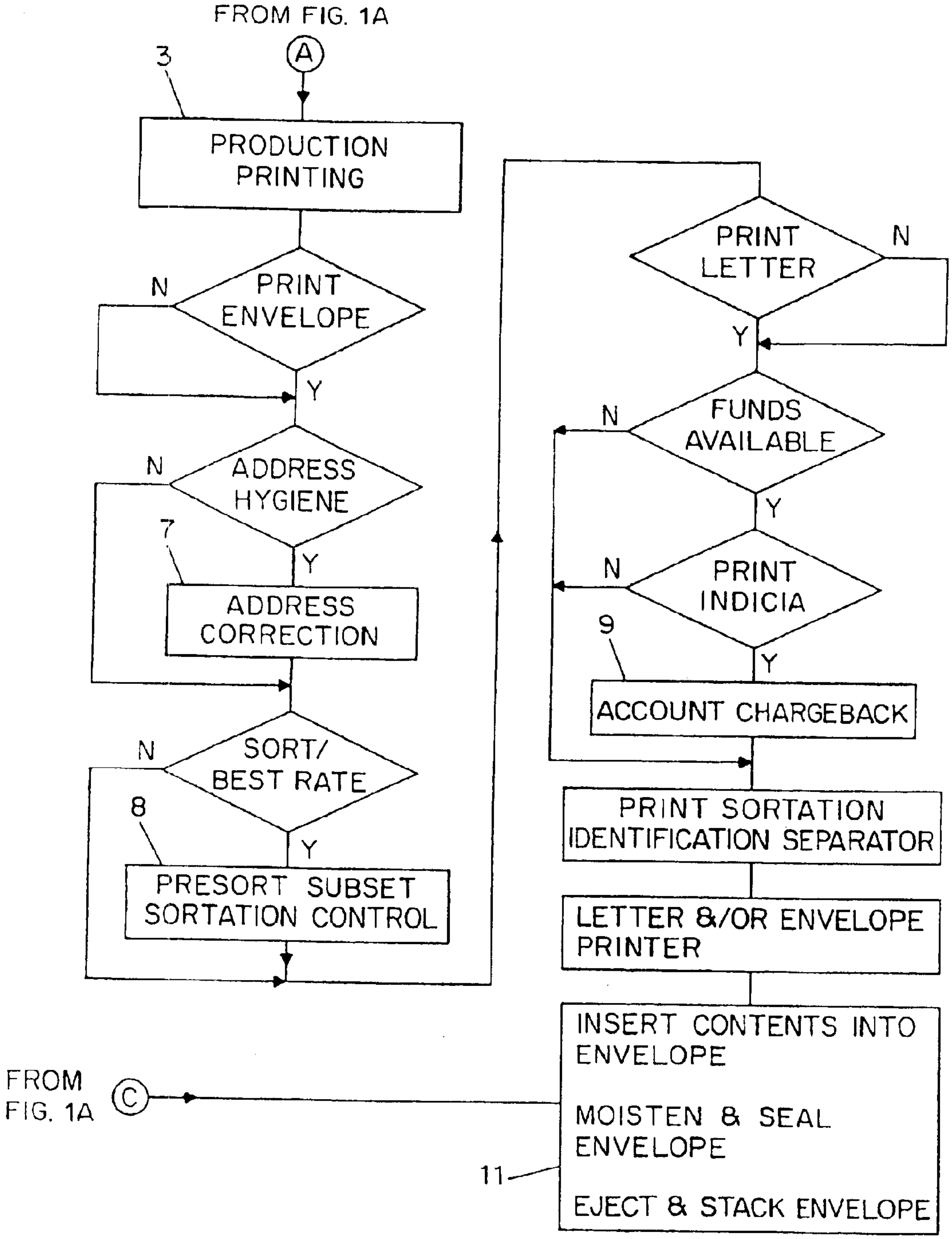
Figure 1C:
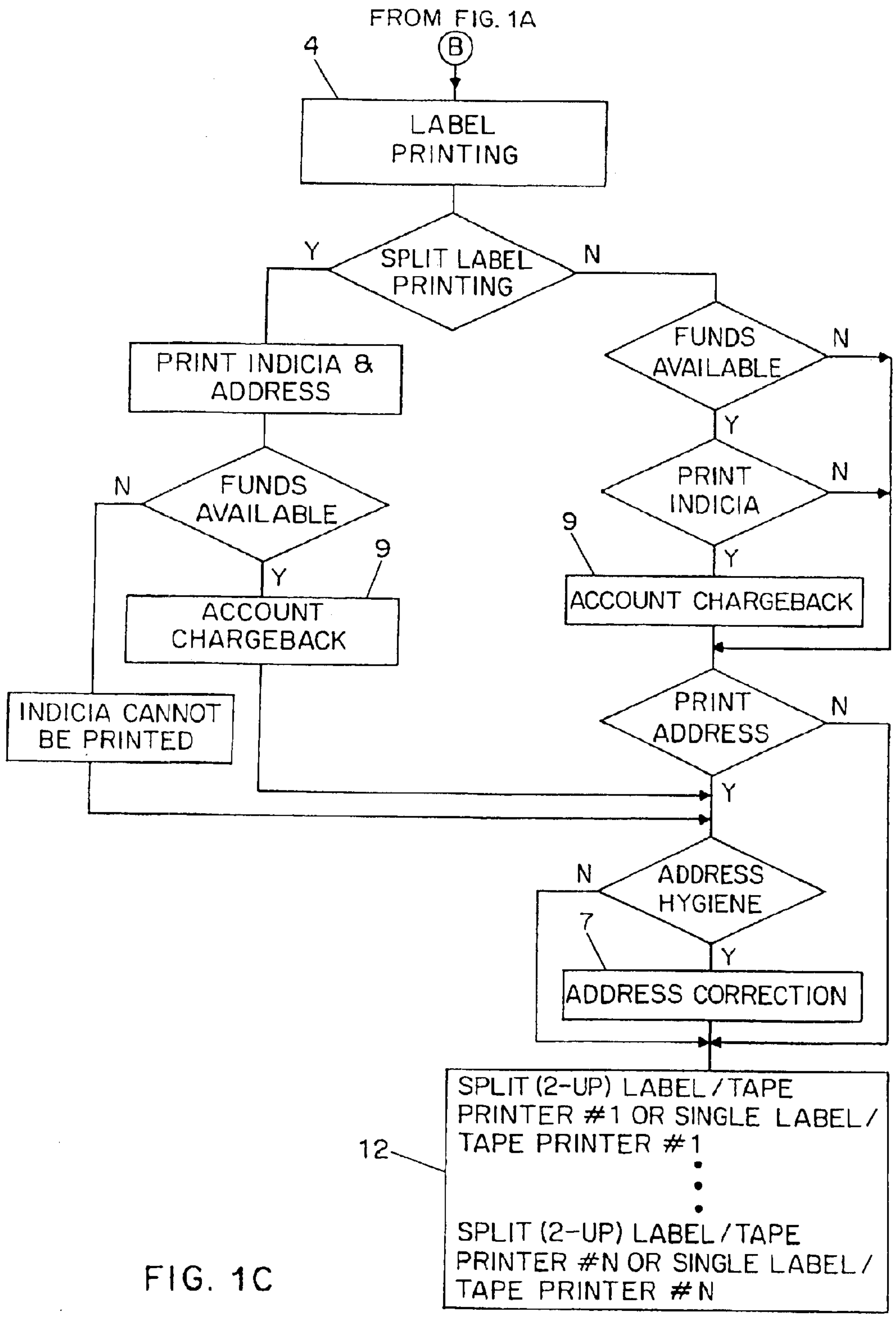

As described in FIG. 1, there is a user interface. This may be a keyboard, a touch screen, or other user input device. The computer 50 handles input requests, formulates desired outputs, and manages the system with respect to configuration parameters such as departmental charge-backs. The data routing can take a document-printing path 2, a high-volume production printing path 3, a label printing path 4, a fax path 5, and an email path 6. In the case of an item of correspondence needing a postal delivery address, it is desired to check the address hygiene as at box 7 and to correct the address accordingly. In the case of an organization that charges back postage charges by departmental or other accounts, then chargeback is done for example in box 9. Many mail types, including business and personal envelopes, are eligible for discounts if the correspondence is presorted, so presort and bundling information is generated in boxes 8. In the case of an item of correspondence that is intended for an envelope with a printed address, the correspondence and envelope may be typed in box 10. Preferably a number of moderate-capacity printers are employed so that if one breaks, the load may be distributed among other printers.

In the case of high-volume production printing, the path of block 3 is followed. If necessary, the mail piece is inserted into an envelope and sealed in block 11.

In the case of a fax message, the path of block 5 is followed. The computer 50 passes the correspondence to a fax modem, or to a fax server 55, which may be integral with the computer 50 or may be separate from it. The correspondence is sent by fax.

In the case of an email message, the path of block 6 is followed. The computer 50 passes the correspondence to a simple mail transport protocol server 54, which may be integral with the computer 50 or may be separate from it. The correspondence is sent by email over a TCP/IP link, omitted for clarity in FIG. 2.

One of the chief drawbacks of the cryptographically signed postal indicium is that the postal service may require that title indicium be based in part on a Zip code or post code of the associated mail piece. This leads to great difficulty in the event that an indicium and its associated addressed envelope or package become mismatched. The postal authorities will assume that the sender is engaged in mail fraud, for example trying to use a single indicium more than once on more than one mail piece. Thus it is highly desirable to set up the system so that if it is printing labels, it will not merely print postal indicia labels, but will also print the delivery address on a label. The address and postage labels are desirably printed "two-up" side by side or adjacent in the label printer. This permits automated equipment, or a human user, to place the two labels on a mail piece (e.g. an envelope or package) at about the same time, thus reducing the likelihood of a mismatch.

Stated differently, the invention comprises a system for management of correspondence, comprising a processor 50 having a user interface 51, said processor 50 communicatively coupled with a printer 53, said printer disposed to print adhesive labels, said processor 50 also communicatively coupled with a fax modem 55, said processor also communicatively coupled with a simple mail transport protocol server 54; said system further comprising means receiving information indicative of items of correspondence to be delivered, the information regarding each item further indicative of at least one means of delivery for said item; said system further comprising means responsive to the information indicative of the at least one means of delivery for causing transmission by fax via the fax modem 55 in the event that the information indicative of the at least one means of delivery indicates fax, for causing transmission by email via the simple mail transport protocol server 54 in the event that the information indicative of the at least one means of delivery indicates email, and in the event that the information indicative of the at least one means of delivery indicates mail requiring labels, causing the postal security device 52 to generate a postage indicium, and causing the printer 53 to print the postage indicium on a label. Optionally, in the event that the information indicative of the at least one means of delivery indicates mail requiring labels, the system prints an address label responsive to the information indicative of the item to be delivered, along with the label bearing the postage indicium.

Those skilled in the art will have no difficulty devising obvious enhancements and improvements to the invention, all of which are meant to be encompassed within the invention, as defined by the claims that follow.

What is claimed is:

1. A system for management of correspondence, comprising a processor having a user interface, said processor communicatively coupled with a printer, said printer disposed to print adhesive labels, said processor also communicatively coupled with a correspondence means, said processor also communicatively coupled with a simple mail transport protocol server; said system further comprising means receiving information indicative of items of correspondence to be delivered, the information regarding each item further indicative of at least one means of delivery for said item; said system further comprising means responsive to the information indicative of the at least one means of delivery for causing transmission by the correspondence means in the event that the information indicative of the at least one means of delivery indicates a specific type of correspondence means, for causing transmission by a specific means in the event that the information indicative of the at least one means of delivery indicates a specific correspondence means, and in the event that the information indicative of the at least one means of delivery indicates mail requiring labels, causing the postal security device to generate a postage indicium, and causing the printer to print the postage indicium on a label.

2. The system of claim 1 wherein in the event that the information indicative of the at least one means of delivery indicates mail requiring labels, the system prints an address label responsive to the information indicative of the item to be delivered, along with the label bearing the postage indicium.

3. A system for management of correspondence, comprising a processor having a user interface, said processor communicatively coupled with a printer, said processor also communicatively coupled with a correspondence means, said processor also communicatively coupled with a simple mail transport protocol server; said system further comprising means receiving information indicative of items of correspondence to be delivered, the information regarding each item further indicative of at least one means of delivery for said item; said system further comprising means responsive to the information indicative of the at least one means of delivery for causing transmission by fax via the correspondence means in the event that the information indicative of the at least one means of delivery indicates a specific type of correspondence means, for causing transmission by a specific means in the event that the information indicative of the at least one means of delivery indicate a specific correspondence means, and in the event that the information indicative of the at least one means of delivery indicate mail, causing the postal security device to generate a postage indicium, and causing the printer to print the postage indicium.

4. A method for management of items of correspondence comprising:

receiving information that identifies at least one item of correspondence to be delivered;

identifying from the information a type of delivery for the at least one item of correspondence; and automatically transmitting the at least one item of correspondence for delivery using the identified type of delivery.

5. The method of claim 4 wherein the at least one item of correspondence is transmitted by fax.

6. The method of claim 4 wherein the at least one item of correspondence is transmitted via electronic mail.

7. The method of claim 4 further comprising, prior to transmitting, inserting the correspondence into an envelope, sealing the envelope and addressing the envelope.

8. The method of claim 7 further comprising printing a postal indicium that is adhered to the envelope.

* * * * *